United States Patent [19]

Manzouji et al.

[11] Patent Number: 5,567,789

[45] Date of Patent: *Oct. 22, 1996

[54] METHOD FOR THE PREPARATION OF ORGANOPOLYSILOXANES

[75] Inventors: Ryuko Manzouji; Tadashi Okawa, both of Chiba Prefecture, Japan

[73] Assignee: Dow Corning Toray Silicone Co., Ltd., Tokyo, Japan

[ * ] Notice: The term of this patent shall not extend beyond the expiration date of Pat. No. 5,567,790.

[21] Appl. No.: 502,447

[22] Filed: Jul. 14, 1995

[30] Foreign Application Priority Data

Jul. 21, 1994 [JP] Japan .................................. 6-191076

[51] Int. Cl.$^6$ ........................................ C08G 77/08
[52] U.S. Cl. ........................ 528/18; 528/14; 528/21; 528/37
[58] Field of Search ................... 528/37, 14, 18, 528/21

[56] References Cited

U.S. PATENT DOCUMENTS

| | | | |
|---|---|---|---|
| 4,977,290 | 12/1990 | Evans et al. | 556/459 |
| 5,169,920 | 12/1992 | Okawa | 528/34 |
| 5,401,822 | 3/1995 | Collins et al. | 528/37 |

FOREIGN PATENT DOCUMENTS

| | | |
|---|---|---|
| 0429928 | 6/1991 | European Pat. Off. . |
| 0455163 | 11/1991 | European Pat. Off. . |
| 0510873 | 10/1992 | European Pat. Off. . |

OTHER PUBLICATIONS

ACS Polymer Preprints 10 [2] pp. 1361–1367, 1969.

*Primary Examiner*—Melvyn I. Marquis
*Attorney, Agent, or Firm*—Alexander Weitz

[57] ABSTRACT

A highly efficient method for preparing an organopolysiloxane which contains little low molecular weight organosiloxane is disclosed, said method comprising:

(I) polymerizing (A) cyclic trisiloxane having the formula $$\left[ \begin{array}{c} R \\ | \\ (SiO)_3 \\ | \\ R \end{array} \right]$$

wherein R is a monovalent hydrocarbon radical, excluding aryl radical, using as a polymerization initiator (B) a lithium compound having the formula $$X-O(\overset{\overset{\displaystyle R'}{|}}{\underset{\underset{\displaystyle R'}{|}}{Si}}O)_m-X'$$

in which R' is independently selected from monovalent hydrocarbon radicals, X and X' are selected from the group consisting of hydrogen and lithium, with the proviso that one of X and X' must be lithium, and m is an integer having a value of at least 1, optionally, in the presence of (C) a molecular-weight regulator selected from the group consisting of water and a compound having the formula $$HO(\overset{\overset{\displaystyle R'}{|}}{\underset{\underset{\displaystyle R'}{|}}{Si}}O)_p H$$

in which R' has its previously defined meaning and p is an integer having a value of at least 1, said polymerization taking place in the presence of both (D) a nitrile compound and (E) an active hydrogen-free polar solvent; and (II) terminating the polymerization reaction product from step (I) with a neutralizing agent selected from the group consisting of an acid and an organohalosilane.

15 Claims, No Drawings

METHOD FOR THE PREPARATION OF ORGANOPOLYSILOXANES

FIELD OF THE INVENTION

This invention relates to a method for the preparation of organopolysiloxanes. More particularly, this invention relates to a novel method for the preparation of organopolysiloxanes that contain little low-molecular-weight organosiloxane.

BACKGROUND OF THE INVENTION

Organopolysiloxanes are typically prepared by the ring-opening equilibration polymerization of cyclic oligosiloxane in the presence of acid or base catalyst. The organopolysiloxanes yielded by this method generally contain low-molecular-weight organosiloxane (having a degree of polymerization (DP) of up to about 25) at a level of from several thousand ppm (parts per million) to several tens of thousands ppm. This can impose rather severe limitations on the application of these organopolysiloxanes. An example of this occurs in the application of silicone products prepared from organopolysiloxane containing large amounts of low-molecular-weight organosiloxane. When such silicone products are used under semi-sealed conditions in the vicinity of a micromotor, relay, or switch, mounted within an electrical or electronic device, electrical discharges convert the low-molecular-weight organosiloxane volatilizing from the silicone product into insulating materials, such as silica and the like. This, in turn, causes such undesirable phenomena as poor contact at relays and switches, micromotor stoppage, and so forth. These phenomena are known as "electrical contact faults." The demand, therefore, exists for organopolysiloxane that contains little low-molecular-weight organosiloxane.

Quite a few methods have been disclosed for the purpose of reducing the level of low-molecular-weight organosiloxane in organopolysiloxanes. Methods such as stripping, solvent extraction, molecular distillation, wiped-film evaporation, and supercritical extraction are already known. However, these methods suffer from a low treatment efficiency when applied to organopolysiloxane containing large amounts of low-molecular-weight organosiloxane, which necessitates multiple treatment passes since a single treatment cannot reduce the low-molecular-weight organosiloxane content to acceptable levels. As a result, in order to reduce the load on these purification processes, the development of a method of organopolysiloxane preparation that provides a minimal content of low-molecular-weight organosiloxane from the very outset is desired.

A method is in fact known for the preparation of organopolysiloxane that contains less low-molecular-weight organosiloxane than organopolysiloxane prepared by equilibration polymerization. This method employs the nonequilibration polymerization of cyclic trisiloxane catalyzed by a lithium compound or pentacoordinate silicon compound (refer, for example, to ACS Polymer Preprints, Volume 10, Number 2, 1361 (1969)). However, even organopolysiloxane prepared by this nonequilibration polymerization methodology contains low-molecular-weight organosiloxane at a level of several hundred ppm to several thousand ppm, with the result that this product is still not fully acceptable for direct application as a starting polymer for the electrical/electronic silicone products discussed above.

SUMMARY OF THE INVENTION

The present inventors discovered that the addition of a nitrile compound to the nonequilibration polymerization of cyclic trisiloxanes can substantially inhibit the production of low-molecular-weight organosiloxane.

In specific terms, the object of the present invention is the introduction of a novel method for the preparation of organopolysiloxanes that contain little low-molecular-weight organosiloxane.

The object of the present invention is achieved by a method for the preparation of organopolysiloxane with the formula

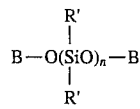

wherein R' independently denotes a monovalent hydrocarbon group, B is a hydrogen atom or an organosilyl group, and n is an integer with a value of at least 30, said method comprising (I) polymerizing (A) at least one cyclic trisiloxane with the formula

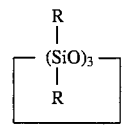

wherein R denotes a monovalent hydrocarbon group, excluding aryl group, using as polymerization initiator (B) a lithium compound with the formula

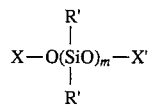

in which R' is a monovalent hydrocarbon group, X and X' can each be a hydrogen atom or a lithium atom with the proviso that one of X and X' must be a lithium atom, and m is an integer with a value of at least 1, optionally, in the presence of (C) a molecular-weight regulator with the following formula

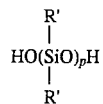

in which R' is as defined above and p is an integer with a value of 0 or greater and in the presence of both (D) a nitrile compound and (E) an active hydrogen-free polar solvent; and (II) terminating the polymerization reaction product from step (I) using an acid or an organohalosilane. This method has been disclosed in Hei-6-191076 as filed in Japan on July 21, 1994, the specification of which is hereby incorporated by reference.

DETAILED DESCRIPTION OF THE INVENTION

The present invention will be explained in detail in the following.

The cyclic trisiloxanes with the formula

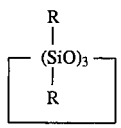

comprising component (A) used by the present invention are already known as monomers for nonequilibration polymerization. The substituent R in the preceding formula represents monovalent hydrocarbon groups, which may be the same or may differ, and is exemplified by alkyl groups such as methyl, ethyl, propyl, butyl, pentyl, and hexyl; alkenyl groups such as vinyl, allyl, butenyl and hexenyl; and aralkyl groups such as benzyl and phenethyl. Methyl and vinyl are preferred for R from the standpoint of ease of synthesis. Subject cyclic trisiloxanes are exemplified by hexamethylcyclotrisiloxane, 1,3,5-trimethyl-1,3,5-trivinylcyclotrisiloxane, and so forth. For the purpose of the present invention, R can not be an aryl group (i.e., a monovalent group wherein the benzene ring is bonded directly to a silicon atom). Thus, when R is an aryl group, such as phenyl or tolyl, the organopolysiloxane prepared according to the instant method has an unacceptably high level of low molecular weight organosiloxane species (i.e., >1,000 parts per million, as discussed infra).

The lithium compound (B) used as the polymerization initiator has the following formula.

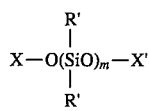

R' in this formula represents monovalent hydrocarbon groups, which may be the same or may differ, and is exemplified by alkyl groups such as methyl, ethyl, propyl, butyl, etc.; aryl groups such as phenyl, tolyl, xylyl, etc.; aralkyl groups such as benzyl, phenethyl, etc.; and alkenyl groups such as vinyl, allyl, butenyl, hexenyl, etc. X and X' can each be a hydrogen atom or a lithium atom, but one of X and X' must be the lithium atom. The subscript m is an integer with a value of at least 1; preferably m is in the range from 1 to 20. Thus, component (B) encompasses monolithiated and dilithiated diorganosilanediols and monolithiated and dilithiated alpha,omega-dihydroxydiorganopolysiloxanes.

These compounds are exemplified by the following: monolithiated and dilithiated dimethylsilanediol, monolithiated and dilithiated diphenylsilanediol, monolithiated and dilithiated methylphenylsilanediol, monolithiated and dilithiated divinylsilanediol, monolithiated and dilithiated methylvinylsilanediol, monolithiated and dilithiated alpha,omega-dihydroxypolydimethylsiloxanes, monolithiated and dilithiated alpha,omega-dihydroxypolydiphenylsiloxanes, monolithiated and dilithiated alpha,omega-dihydroxymethylphenylpolysiloxanes, monolithiated and dilithiated alpha,omega-dihydroxypolydivinylsiloxanes, monolithiated and dilithiated alpha,omega-dihydroxypolymethylvinylsiloxanes, and the like.

Methods are already known for the preparation of these monolithiated and dilithiated diorganosilanediols and monolithiated and dilithiated alpha,omega-dihydroxydiorganopolysiloxanes. In one method, for example, the diorganosilanediol (or alpha,omega-dihydroxydiorganopolysiloxane) is first prepared by a careful hydrolysis with dilute aqueous base of the corresponding diorganodichlorosilane (or alpha, omega-dichlorodiorganopolysiloxane), and this intermediate is then lithiated by reaction with lithium metal, organolithium, lithium hydroxide, or lithium diisopropylamide. Another method provided as exemplary of this synthesis consists of the reaction of lithium hydroxide with cyclic trisiloxane.

The lithium compound polymerization initiator should be used in sufficient quantity to induce the ring-opening reaction, and it is preferably deployed in a quantity that provides values of 100:0 to 0.01:100 for the polymerization initiator (lithium compound):molecular-weight regulator (silanol compound or water, vide infra) molar ratio. Values of 0.5:99.5 to 50:50 of (B) to (C) are even more preferred for this molar ratio from the standpoint of productivity because they give good polymerization rates.

The molecular-weight regulator comprising component (C) in the present invention can be the mixture of polymerization initiator and unreacted silanol-functional diorganosilanediol or unreacted silanol-functional alpha,omega-dihydroxydiorganopolysiloxane afforded by the preparation of polymerization initiator using fewer moles of organolithium than moles of silanol group. On the other hand, it may consist of a separate addition of fresh diorganosilanediol or alpha,omega-dihydroxydiorganopolysiloxane unrelated to the starting material for the polymerization initiator. The molecular-weight regulator therefore has the following formula.

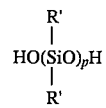

The subscript p in this formula is an integer with a value of 0 or greater, which means that water (p=0) may be used as molecular-weight regulator. R' is as defined above.

Component (E), which comprises polar solvents that are free of active hydrogen, is added in order to promote the polymerization. Preferred as this polar solvent are tetrahydrofuran, 1,4-dioxane, ethylene glycol dimethyl ether, diethylene glycol dimethyl ether, dimethylformamide, dimethyl sulfoxide, and hexamethylphosphoramide. These solvents may be used as mixtures of two or more. The quantity of addition of the polar solvent cannot be specified in a simple manner because the ability to promote the polymerization varies from solvent to solvent. For example, when the cyclic trisiloxane is hexamethylcyclotrisiloxane, the preferred ranges (in each case based on this siloxane) are 50 to 200 weight % for tetrahydrofuran, 0.5 to 5 weight % for dimethyl sulfoxide, and 1 to 20 weight % for dimethylformamide. Dimethylformamide is particularly preferred among the preceding based on a general consideration of the ability to promote the polymerization, ease of removal after termination of the polymerization, and economics. Polymerization is almost completely absent in the absence of the active hydrogen-free polar solvent.

The nitrile compound (D) is the component that characterizes the present invention: it functions to suppress side reactions during polymerization and thereby reduce the content of low-molecular-weight organosiloxane. Said nitrile compounds (D) are exemplified by acetonitrile, propionitrile, succinonitrile, butyronitrile, isobutyronitrile, valeronitrile, alpha-tolunitrile, and the like. Mixtures of two or more of these nitriles may also be used. Among these nitriles, acetonitrile is the most preferred based on considerations of ease of removal after termination of the polymerization, economics, and toxicity. The weight ratio of (D) to (A) is preferably 0.01 to 10, more preferably 0.1 to 1.0.

The preparative method according to the present invention proceeds through the component (B)-induced nonequilibration polymerization (I) of component (A) in the presence of components (D) and (E) and optionally in the presence of component (C). The reaction temperature and reaction time must be carefully controlled during this process in order to avoid redistribution reactions. Side reactions that produce low-molecular-weight organosiloxane cyclics occur when the polymerization ceases to be a nonequilibration polymerization and becomes an equilibrium polymerization with the appearance of redistribution.

When hexamethylcyclotrisiloxane is used as component (A), the preferred reaction conditions for the nonequilibration polymerization consist of reaction for 1 to 50 hours at 0° C. to 40° C. The instant nonequilibration polymerization reaction may be run without the use of solvent other than components (D) and (E), but it is preferably run with the addition of an aprotic nonpolar solvent in order to be able to run the polymerization as a homogeneous system. Solvents usable for this purpose are nonexhaustively exemplified by aromatic solvents such as toluene, xylene, and the like, and by aliphatic solvents such as hexane, heptane, cyclohexane, and the like.

In general, the polymerization reaction is preferably implemented by monitoring the decrease of starting monomer (A) through, for example, gas chromatography (GLC), and terminating the reaction by the neutralization step (II) when the conversion has reached a specific or constant value. The time point for termination of the reaction varies widely as a function of the type of starting monomer (A) and the nature of the target polymer. However, as a general rule, the reaction should be terminated when the conversion has reached 50 to 100% and preferably when the conversion has reached 70 to 95%.

The molecular weight of the organopolysiloxane product is determined in the preparative method according to the present invention by the ratio of polymerization initiator+ molecular-weight regulator to cyclic trisiloxane consumed. In addition, since the silanol group of the molecular-weight regulator used by the present invention undergoes a rapid and reversible exchange reaction with the lithium silanolate group of the polymerization initiator, the diorganosilanediol and alpha,omega-dihydroxydiorganopolysiloxane which are starting materials for the polymerization initiator may themselves be used as molecular-weight regulators.

Any neutralizing agent that will react with the lithium silanolate group to produce a stable lithium salt may be used to terminate the reaction. These neutralizing agents are exemplified by moist carbon dioxide; mineral acids such as hydrochloric acid, sulfuric acid, and so forth; carboxylic acids such as acetic acid, propionic acid, acrylic acid, and so forth; and functional halosilanes such as dimethylchlorosilane, dimethylvinylchlorosilane, methacryloxypropyldimethylchlorosilane, chloropropyldimethylchlorosilane, and so forth. Termination with moist carbon dioxide, mineral acid, and carboxylic acid yields silanol-endblocked polymer, while termination with halosilane yields endblocking silyl groups corresponding to the halosilane from which the halogen has been removed. Thus, termination by acid should be used when the introduction of silanol at both terminals of the organopolysiloxane product is desired, while termination with functionalized halosilane should be used when the introduction of silicon-bonded functional groups is desired. Moreover, various types of functional groups may be introduced by running a dehydrohalogenation reaction by the addition of the corresponding halosilane to the silanol-endblocked organopolysiloxane afforded by acid termination. It is recommended that this reaction be run in the presence of a hydrogen halide acceptor, such as an amine. In addition, organopolysiloxane having the SiH functionality at both terminals can be prepared by using SiH-containing halosilane, such as dimethylchlorosilane, as the terminating agent. This diterminal-SiH-functional organopolysiloxane may also be used to prepare the corresponding diterminal-functionalized organopolysiloxane through hydrosilylation with organofunctionalized alkenyl compounds, such as allyl glycidyl ether, allylamine, allyl alcohol, trimethylolpropane monoallyl ether, glycerol monoallyl ether, allyl methacrylate, and the like. When this hydrosilylation reaction is run, the functional group should be protected as necessary with a protecting group, such as trimethylsilyl, and regenerated after completion of the reaction by removing the protective group.

The organopolysiloxanes afforded by the preparative method described above have the following formula

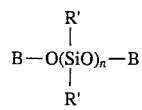

wherein R' is defined as above, B is a hydrogen atom or an organosilyl group, and n is an integer with a value of at least 30. These organopolysiloxanes contain no more than 1,000 ppm of low-molecular-weight organosiloxane having DPs up to 25.

EXAMPLES

The instant invention is explained in greater detail in the following through working examples. The number-average molecular weight and dispersity values reported in the examples were measured by gel permeation chromatography (GPC) calibrated with polydimethylsiloxane standards. The dimethylformamide and acetonitrile were dried by standard methods prior to use. Unless indicated to the contrary, all procedures were carried out at room temperature (i.e., approximately 25° C). Polymerization reactions were carried out under a dry nitrogen atmosphere.

Example 1

One hundred grams (449.5 mmoles) of hexamethylcyclotrisiloxane (D$_3$) and 75 g of toluene were mixed, and this mixture was azeotropically dehydrated for 1 hour and then cooled to room temperature. 1.07 g (2.7 mmoles) of alpha, omega-dihydroxyoligodimethylsiloxane (hydroxyl content= 8.56 weight %) and then 0.1 mL of a 1.71N hexane solution of n-butyllithium (0.17 mmoles) were introduced into a separate reaction flask and the contents were stirred for 1 minute at room temperature. This was followed by the addition of the previously prepared toluene solution of D$_3$ and then a mixture of 8 g of dimethylformamide and 25 g of acetonitrile, and the reaction was thereafter stirred at room temperature. The D$_3$ conversion was monitored by GLC (gas chromatography), and the polymerization was terminated by the addition of 0.02 g acetic acid when the conversion had reached 82.2% after 2 hours and 10 minutes. Removal of the low boilers by distillation under reduced pressure followed by sterilizing filtration yielded 82.3 g of a colorless and transparent polymer. This material was determined to be polydimethylsiloxane endblocked at both terminals by silanol and having a number-average molecular weight of 29,411 and a dispersity of 1.05. The low-molecular-weight dimethylsiloxane in this polydimethylsiloxane was extracted with acetone and determined by temperature-programmed GLC (detector: FID) using n-undecane as standard. The content of dimethylsiloxane having a DP up to 25 was found to be 660 ppm (parts per million by weight).

Example 2

One hundred grams (449.5 mmoles) of hexamethylcyclotrisiloxane ($D_3$) and 75 g of toluene were mixed, and this mixture was azeotropically dehydrated for 1 hour and then cooled to room temperature. To this were added 0.014 g (0.124 mmoles) dilithiated diphenylsilanediol and then a mixture of 48.1 microliters (2.67 mmoles) of water, 8 g of dimethylformamide, and 25 g of acetonitrile, and the reaction was thereafter stirred at room temperature. The $D_3$ conversion was monitored by GLC, and the polymerization was terminated by the addition of moist dry ice when the conversion had reached 82.6% after 4 hours. Removal of the low boilers by distillation under reduced pressure followed by sterilizing filtration yielded 82.1 g of a colorless and transparent polymer. This material was determined to be polydimethylsiloxane endblocked at both terminals by silanol and having a number-average molecular weight of 29,393 and a dispersity of 1.04. Using the procedure described in Example 1, the content of low-molecular-weight dimethylsiloxane (DP up to 25) in this dimethylpolysiloxane was determined to be 451 ppm.

Example 3

A polymerization was run as described in Example 2, but in this case using 0.007 g (0.062 mmoles) of dilithiated diphenylsilanediol. The polymerization was terminated as in Example 2 when the $D_3$ conversion had reached 78.8% after 5 hours and 30 minutes. Work up as in Example 2 yielded polydimethylsiloxane endblocked by silanol at both terminals and having a number-average molecular weight of 29,260 and a dispersity of 1.05. The content of low-molecular-weight dimethylsiloxane in this dimethylpolysiloxane was measured using the procedure described in Example 1, and the content of dimethylsiloxane with DP up to 25 was found to be 532 ppm.

Example 4

A polymerization was run as described in Example 2, but in this case using 0.0035 g (0.031 mmoles) of dilithiated diphenylsilanediol. The polymerization was terminated as in Example 2 when the $D_3$ conversion had reached 82.2% after 7 hours and 20 minutes. Work up as in Example 2 yielded polydimethylsiloxane endblocked by silanol at both terminals and having a number-average molecular weight of 29,611 and a dispersity of 1.04. The content of low-molecular-weight dimethylsiloxane in this dimethylpolysiloxane was measured using the procedure described in Example 1, and the content of dimethylsiloxane with DP up to 25 was found to be 742 ppm.

Comparative Example 1

A polymerization reaction was run as described in Example 1, but in this case omitting the acetonitrile that was used in Example 1. The polymerization was terminated as in Example 1 when the $D_3$ conversion had reached 79.8% after 1 hour and 30 minutes. Work up as in Example 1 yielded polydimethylsiloxane endblocked by silanol at both terminals and having a number-average molecular weight of 29,411 and a dispersity of 1.05. The content of low-molecular-weight dimethylsiloxane in this dimethylpolysiloxane was measured using the procedure described in Example 1, and the content of dimethylsiloxane with DPs up to 25 was found to be 2,491 ppm.

That which is claimed is:

1. A method for preparing an organopolysiloxane, said method comprising:
(I) polymerizing
  (A) cyclic trisiloxane having the formula

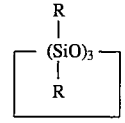

wherein R independently denotes a monovalent hydrocarbon radical, excluding aryl radical, in the presence of
  (B) a lithium compound having the formula

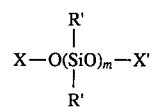

in which R' independently denotes a monovalent hydrocarbon radical, X and X' are selected from the group consisting of hydrogen and lithium, with the proviso that one of X and X' must be lithium, and m is an integer having a value of at least 1,
optionally, in the presence of
  (C) a molecular-weight regulator selected from the group consisting of water and a compound having the formula

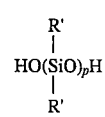

in which R' has its previously defined meaning and p is an integer having a value of at least 1,
said polymerization taking place in the presence of both
  (D) a nitrile compound and
  (E) an active hydrogen-free polar solvent; and
(II) terminating the polymerization reaction product from step (I) with a neutralizing agent selected from the group consisting of an acid and an organohalosilane.

2. The method according to claim 1, wherein the content of low-molecular-weight species having a degree of polymerization up to 25 in said organopolysiloxane is ≦1,000 ppm by weight.

3. The method according to claim 1, wherein R is independently selected from the group consisting of alkyl groups, aralkyl groups and alkenyl groups and R' is independently selected from the group consisting of alkyl groups, aryl groups, aralkyl groups and alkenyl groups.

4. The method according to claim 3, wherein the content of low-molecular-weight species having a degree of polymerization up to 25 in said organopolysiloxane is ≦1,000 ppm by weight.

5. The method according to claim 4, wherein R is selected from the group consisting of methyl and vinyl.

6. The method according to claim 5, wherein said solvent (E) is selected from the group consisting of tetrahydrofuran, 1,4-dioxane, ethylene glycol dimethyl ether, diethylene glycol dimethyl ether, dimethylformamide, dimethyl sulfoxide and hexamethylphosphoramide.

7. The method according to claim 6, wherein said nitrile compound (D) is selected from the group consisting of acetonitrile, propionitrile, succinonitrile, butyronitrile, isobutyronitrile, valeronitrile and alpha-tolunitrile.

8. The method according to claim 7, wherein said neutralizing agent is selected from the group consisting of moist carbon dioxide, hydrochloric acid, sulfuric acid, acetic acid, propionic acid and acrylic acid.

9. The method according to claim 7, wherein said neutralizing agent is selected from the group consisting of dimethylchlorosilane, dimethylvinylchlorosilane, methacryloxypropyldimethylchlorosilane and chloropropyldimethylchlorosilane.

10. The method according to claim 4, wherein said lithium compound (B) is selected from the group consisting of monolithiated and dilithiated dimethylsilanediol, monolithiated and dilithiated diphenylsilanediol, monolithiated and dilithiated methylphenylsilanediol, monolithiated and dilithiated divinylsilanediol, monolithiated and dilithiated methylvinylsilanediol, monolithiated and dilithiated alpha,omega-dihydroxypolydimethylsiloxanes, monolithiated and dilithiated alpha,omega-dihydroxypolydiphenylsiloxanes, monolithiated and dilithiated alpha,omega-dihydroxymethylphenylpolysiloxanes, monolithiated and dilithiated alpha,omega-dihydroxypolydivinylsiloxanes and monolithiated and dilithiated alpha,omega-dihydroxypolymethylvinylsiloxanes.

11. The method according to claim 10, wherein R is selected from the group consisting of methyl and vinyl.

12. The method according to claim 11, wherein said solvent (E) is selected from the group consisting of tetrahydrofuran, 1,4-dioxane, ethylene glycol dimethyl ether, diethylene glycol dimethyl ether, dimethylformamide, dimethyl sulfoxide and hexamethylphosphoramide.

13. The method according to claim 12, wherein said nitrile compound (D) is selected from the group consisting of acetonitrile, propionitrile, succinonitrile, butyronitrile, isobutyronitrile, valeronitrile and alpha-tolunitrile.

14. The method according to claim 1, wherein said neutralizing agent is selected from the group consisting of moist carbon dioxide, hydrochloric acid, sulfuric acid, acetic acid, propionic acid and acrylic acid.

15. The method according to claim 1, wherein said neutralizing agent is selected from the group consisting of dimethylchlorosilane, dimethylvinylchlorosilane, methacryloxypropyldimethylchlorosilane and chloropropyldimethylchlorosilane.

* * * * *